United States Patent [19]

Owens

[11] Patent Number: 4,576,695

[45] Date of Patent: Mar. 18, 1986

[54] ADHESION PROMOTERS FOR SANITARY CAN COATINGS

[75] Inventor: Phillip M. Owens, Strongsville, Ohio

[73] Assignee: SCM Corporation, New York, N.Y.

[21] Appl. No.: 554,692

[22] Filed: Nov. 23, 1983

[51] Int. Cl.$^4$ .................... C25D 13/10; C25D 13/14; C25D 13/20

[52] U.S. Cl. ............................ 204/181.4; 204/181.6; 204/180.7; 204/181.1; 204/181.2; 204/181.3

[58] Field of Search .......... 204/181 R, 181 C, 181 A, 204/181.4, 181.6, 181.7, 180.7

[56] References Cited

U.S. PATENT DOCUMENTS

| | | | |
|---|---|---|---|
| 3,137,583 | 6/1964 | Bryan et al. | 106/14 |
| 3,154,510 | 10/1964 | Bryan et al. | 260/29.6 |
| 3,215,660 | 11/1965 | Bryan et al. | 260/29.6 |
| 3,556,968 | 1/1971 | De Vittorio | 204/181 R |
| 3,798,143 | 3/1974 | Rolles et al. | 204/181 A |
| 3,850,735 | 11/1974 | Parekh et al. | 204/181 A |
| 3,963,568 | 6/1976 | Nikaido et al. | 204/181 A |
| 4,064,028 | 12/1977 | Miyosawa et al. | 204/181 R |
| 4,419,468 | 12/1983 | Lucas | 204/181 C |

FOREIGN PATENT DOCUMENTS 5150832 10/1974 Japan.

*Primary Examiner*—John F. Niebling
*Assistant Examiner*—B. J. Boggs, Jr.
*Attorney, Agent, or Firm*—A. Joseph Gibbons; Thomas M. Schmitz

[57] ABSTRACT

Certain alkaline earth metal salts of organic acids and diacids optionally having hydroxyl group functionality, as for example calcium and magnesium citrate, calcium dodecylbenzene sulfonate, provide improved adhesion of organic coatings electrodeposited on metal substrate. The new sanitary coatings are particularly useful for untreated aluminum and aluminum alloy cans used in the packaging of various food products including acidic foods like tomatoes, corn, and green beans which require in-can-sterilization.

6 Claims, No Drawings

ADHESION PROMOTERS FOR SANITARY CAN COATINGS

The invention relates to sanitary coatings and to improved adhesion of electrodeposited coatings on aluminum or aluminum alloys. The improved process and composition allows untreated aluminum to be coated with various organic coatings while retaining excellent adhesion properties. A commonly assigned related case, Ser. No. 554,687 filed simultaneously herewith is now U.S. Pat. No. 4,476,263.

BACKGROUND OF THE INVENTION AND PRIOR ART

In the early years of aluminum metal it was believed that aluminum did not require painting. Current technology, quite to the contrary, strongly recommends painting of aluminum surfaces together with rather elaborate steps for pretreating the metal, i.e. alkaline washings, degreasing, deoxidizing, oxidizing, conversion coatings, inhibitive rinsings and the like prior to application of the organic polymer or resin paint. Aluminum and its alloys require various preparation and cleaning, depending on the end use of the product, before a coating is applied. Soil, grease, scale, oil and other materials are usually removed by pre-cleaners, vapor degreasers, emulsion cleaners, solvent cleaners, power or mechanical washer cleaners and tumbling cleaners. Intermediate or final cleaning may precede other treatments such as alkali etches, deoxiderizers, conversion coatings, burnishing compounds or cutting compounds to produce satisfactory finishes. Such operations are quite elaborate and often costly.

There is renewed interest in electrocoating aluminum cans for food items which are processed by sterilization at about 260° F. for a period of 90 minutes. Aluminum cans and aluminum alloy cans have desirable physical properties which make them attractive for use as food containers. In order to make the aluminum cans cost competitive with other food containers, can manufactures would prefer to deposit the protective organic coating on the untreated metal substrate thereby eliminating the conventional treatments such as deoxidizing, oxidizing, conversion coating, etc. as currently practiced in the art. Considerable cost savings could be effected by using untreated metal.

Substantially all commercially finished aluminum is chemically pretreated prior to the application of organic top coats. After degreasing, cleaning, and oxidizing, various conversion coatings are applied to the aluminum surface. These treatments include: (1) chrome-phosphate; (2) chrome-oxide; (3) crystalline (zinc) phosphate; and (4) amorphous (iron) phosphate. The adhesion of paint films to aluminum pretreated with these conversion coatings are rated excellent to fair in the order shown. For sanitary containers such as aluminum food and beverage cans, the prior art chrome-phosphate pretreatments provide superior adhesion of organic top coats. A particular disadvantage of this pretreatment is that rinses must be waste treated to reduce hexavalent chrome and subsequently remove trivalent chrome and fluorides. Typical procedures require a reduction step (sulfur dioxide or bisulfite) and a precipitation with lime. After filtration, the wet cake must be transported to a sanitary land fill. Because of the cost factor and environmental requirements in handling cleaners, rinses, and conversion coatings and the necessity of disposing of residuals, it is desired to provide a working process which eliminates one or more of these precoating steps. Unfortunately, when such pretreatments are eliminated the resulting coatings usually suffer from partial or total adhesion loss, especially when coated cans are used for various foods which require in-can sterilization.

Many approaches have been used to improve the adhesion or organic coatings to aluminum or its alloys. The etch treatment with a mixture of sulfuric acid and chrominum trioxide or sodium dichromate in water is quite old. The patent literature shows various means for enhancing adhesion of aluminum coatings. For example, Hoftatter, U.S. Pat. No. 4,208,223, teaches the use of epoxy functional silanols to treat aluminum surfaces as a separate step prior to painting but subsequent to a cleaning step, a deoxidizing step, and an oxidizing step. In the Hofstatter patent the cleaner can be an alkaline metal borate cleaner and the oxidation can be by chromic acid at low pH.

U.S. Pat. No. 4,243,707 (Wiggins) teaches the condensation of certain metal hydroxides or borates with certain ethylene oxide phosphate emulsifiers to provide adhesion promoters for coating metal substrates with an acrylonitrite copolymer latex.

U.S. Pat. No. 4,180,620 (Inskip) teaches the use of 0.01–0.5 weight percent magnesium, zinc, lead or calcium salts of neodecanoic acid to improve the adhesion of plasticized poly(vinyl butyral) sheets to glass, especially in laminates. These salts are applied to the sheets as a solution optionally containing anionic or non-ionic surfactants during extrusion of the sheets.

In Japanese patent application No. JP 7543799, M. Kaibu et al (C.A. 86(10)56875g) teach the immersion of an anodized aluminum alloy in an aqueous solution (0.1–50%) of a hydroxycarboxylic acid or its ammonium salt prior to electrophoretic deposition of a water-soluble acrylic resin. Coatings with improved bonding strengths result using immersion treatments of ammonium salts of tartaric and citric acid.

A similar Canadian Pat. No. CA 996497, to W. Friedman and H. G. Gerascheid, uses an aqueous solution containing 0.0005–0.5 g hydroxycarboxylic acid (citric acid) or its water-soluble salt for sealing the previously anodized aluminum surface.

B. W. Samuels, K. Sotomdek and R. Foley (Corrosion, Vol. 37, No. 2, pp. 92–93, 1971) have attempted to address the problem of corrosion of aluminum alloy 2024-T3 and have evaluated various potential inhibitors. In a controlled experiment certain treatments were applied to the metal substrate prior to a 14-day immersion test using an air saturated solution of 0.1N sodium chloride at room temperature. Test results show that sodium salts of citric acid and tartaric acid not only failed as corrosion inhibitors but indeed gave accelerated corrosion at certain concentrations. This is particularly interesting in view of the instant invention where similar organic acid salts are found to be highly effective for promoting adhesion of organic coatings to metal when the salts are prepared from multivalent metals.

Coatings, as for example epoxy and acrylic coatings, can be applied by electrocoating methods, quite often, where the substrate serves as the anode and the electrocoating tank serves as the cathode. The electrodeposition process, also referred to as electrophoresis, electrocoating, electropainting and by other names is described in some detail by M. W. Ranney in a chapter "Electrodeposition and Waterborne Coatings", Chemical Technology Review No. 97 on pages 47-91, (Noyes Data Corp., 1977). By electrodeposition is meant a process whereby aqueous compositions, including solutions, dispersions or suspensions, containing from one to 25 percent by weight of film former (resin), and usually less than 10 percent, comprises a bath in an electrocoating tank. The object to be coated and the tank are connected to opposite terminals of a high current, low voltage (up to 200 volts) DC supply. Current passes through the bath and deposits a semi-solid plastic layer on the object. The coated part is withdrawn from the bath, washed with clear water and baked in an oven to form a solid coating film on the object. These coatings can serve as prime coatings or for single coat applications. Aluminum cans, when so coated, and subjected to the required sterilization processing (90 minutes at 260° F.) exhibit poor adhesion. Foods such as tomatoes, corn, and green beans adversely affect the adhesion of the epoxy-acrylic coatings. These difficulties have been overcome by the addition of selective adhesion promoters to the electrocoating formulations.

BRIEF STATEMENT OF THE INVENTION

One object of the present invention is an electrodeposition process and composition for coating untreated metal cans, including aluminum and aluminum alloy cans, so that they can be used for food products which require sterilization processing at high temperatures.

Another object is to provide adhesion promoters for such organic coatings, including epoxy or acrylic coatings, which can be applied to untreated metal cans by electrodeposition.

A further object is a method for improving the adhesion of water-base paints to an untreated aluminum substrate which comprises:

(a) cleansing the aluminum surface with an aqueous acid wash and water washing said cleaned surface
(b) subjecting the cleaned aluminum to an electrocoating paint composition comprising an epoxy or acrylate resin, a cross-linking agent and about 0.01 to about 2.0 parts, basis total resin, of an adhesion promoter selected from the group consisting of one or more alkaline earth metal salts of an organic acid selected from the group consisting of:
(1) a non-aromatic acid having at least two acid functional groups and optionally one or more hydroxyl functional group;
(2) a non-aromatic acid having at least one acid functional group and at least one hydroxyl group;
(3) an aromatic acid having at least one acid functional group attached to the aromatic ring and optionally also containing a phenolic hydroxyl group; or mixtures thereof and wherein said metal is a multivalent metal selected from the group consisting of calcium, magnesium, strontium, barium and zinc;
(4) electrodepositing said composition to deposit a film coating on said substrate;
(5) curing said deposited film.

DETAILED DESCRIPTION OF THE INVENTION

The ability of coatings to form adherent films on various metal substrates is complicated when such coatings have to undergo such rigorous exposure as coatings that are used for food contact. Coatings that must withstand 250° F.-260° F. processing in various foods require excellent adhesion to the metal surface. In many cases the metal must be treated chemically in some manner to enhance the adhesive properties of the coating to the metal. When metals such as aluminum are not treated, the adhesion properties of most coatings are usually unsatisfactory.

This invention overcomes the adhesion problems of organically electrocoated food cans made from cleaned, untreated aluminum and aluminum alloy cans. Certain metal salts of organic acids, when added to electrocoat formulations, improve the adhesion of the coating to metal cans and allow such cans to contain food packed with high water content, especially acidic foods like tomatoes. The effective metal salts include polyvalent metal salts, especially divalent metal salts such as magnesium, calcium, strontium, barium and zinc. Of course, the choice and use of particular metal salts or mixtures will be governed by their physical properties, solubility and leachability in the specific food product medium. It is important to monitor such properties and evaluate their influence on the taste of particular food or beverage. Barium and strontium salts are generally useful for non-food applications. The divalent calcium salts are most preferred especially since a number of the useful adhesion promoters have been approved for food contact use. With the exception of zinc the effective metals are selected from the group known as the alkaline earth metals.

Organic coatings having improved adhesion can be obtained by adding to the organic coating, from about 0.02 to about 2.0 percent of selected salts, for example calcium citrate, calcium ascorbate or calcium benzene/sulfonate. Cans protected with such coatings can be used for the containment of such foods as tomatoes, corn, dog food and green beans which are usually sterilized by heating for about 90 minutes at 250° F.

The metal salts may be prepared from a variety of organic acids in the usual fashion. Organic acids suitable for forming metal salt adhesion promoters, advantageously have a multiplicity of acid functional groups. Such functional groups include the carboxylic acid group

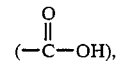

the phosphoric acid group

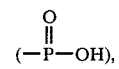

the sulfonic acid group (SO$_3$H) and mixtures thereof.

Metals salts of various hydroxy acids can be employed as adhesion promoters. Suitable hydroxy acids include such compounds as salicylic acid, glycollic acid, a-hydroxy butyric acid, dimethylol propionic acid, mandelic acid, 2-hydroxy-3-methylbenzoic acid, lactic acid, gallic acid, 2,4-dihydroxybenzoic acid, 1-hydroxy-2-naphthoic acid, 2-hydroxy-1-naphtoic acid, and other aliphatic and aromatic hydroxyl-containing carboxylic acids. For some applications carboxylic acids containing phenolic hydroxy groups are useful in the practice of the present invention. These usually impart some degree of alkali resistance and other desirable properties to the coatings. A preferred hydroxy group containing acid is salicylic acid.

Suitable organic acids having acid functionality useful as metal salts in the instant invention include citric acid, tartaric acid, salicyclic acid, gluconic acid, glycllic acid, lactic acid, malic acid and the like. Preferred as adhesion promoters are the salts of citric acid and most preferred is calcium citrate. The preferred acids for preparing adhesion promoter salts are soluble or partially soluble in water. Although in some instances the metal salts may react with more than a stoichiometric amount of the organic acid, usually the stoichiometric quantity of acid is preferred. In certain instances magnesium acid citrate may be used as partial substitution for magnesium citrate. Usually, however, the full salts are preferred. Certain advantages can result from the use of mixtures of metal salts or more than one carboxylic acid, as for example, the mixture of calcium citrate with calcium salicylate.

Not all salts are effective. Those made from stronger inorganic acids, appear to be detrimental for adhesion when they are incorporated in a similar manner in the epoxy-acrylic electrocoat. A typical epoxy electrocoat composition contains 100 parts of epoxy-acrylic resin composition (28% solids), 5 parts of crosslinking agent, 300 parts water, and 0.03 parts calcium citrate. Of course, the epoxy electrocoat will usually contain the usual additives and solvents such as phenolic resins, cyclohexanol, butyl cellusolve, and amine neutralizing or solubilizing agents such as for example dimethylethanolamine. Calcium acetate is considerably less effective than calcium citrate as an adhesion promoter. Apparently, the more acidic anions disrupt the adhesive layer between the organic coating and the metal surface.

By untreated aluminum is meant aluminum metal or alloy suitable for use as a substrate for paint or coating, including deposition by electrocoating processes and which do not require a specific surface treatment other than one or more steps for washing, cleaning, including mechanical cleaning, and/or drying steps. Thus, untreated aluminum would specifically exclude deoxidizing, oxidizing, conversion coatings, flame cleaning, phosphatizing and the like prior to the application of the paint or coating. Chemical treatments are excluded by the term "untreated aluminum" as are surface destructive treatments such as anodizing treatments. Anodic oxidation is an electrochemical process in which the oxide film is increased in thickness basically by making the anode in a cell containing a suitable electrolyte to produce oxide coatings. Also excluded are those produced by chemical conversion coatings, i.e. chromate, carbonate, phosphate and zinc immersion coatings.

Aluminum substrates useful in the present invention include pure aluminum and other aluminum products such as aluminum alloys containing up to 30 percent of alloying metals. High purity aluminum is soft and lacks strength. Through the addition of small amounts of other elements, alloys having high strength-to-weight ratios can be formed, worked and can accept a wide variety of finishes. Markets for coated aluminum include the building and construction industry. For example, alloys such as 3003, 3004, 3105 and others are used for residential siding, industrial roofing and siding, and form roofing and siding. Gutters and downspouts are also fabricated from these alloys. For beer and beverage cans, alloys, as for example, 3004 and 5182 are used for can bodies and ends respectively. The aluminum substrates most desirable for sanitary cans for the containment and processing (sterilization) of various foods are the aluminum alloys containing copper, silicone, manganese, magnesium and combinations thereof. Such aluminum substrates are not restricted to any particular size or shape. Alloy 5352 was previously the alloy of choice for food containment cans. In the best mode examples, a more recent aluminum alloy, designated as ALCOA 5042, was used as the untreated aluminum.

Although the preferred coating for electrodeposition on aluminum are epoxy-acrylic resin coatings in latex or water-dilutable form, other common organic coatings known to the art may be advantageously used. These additional polymeric materials, usually prepared by vinyl polymerization, include for example various polymeric materials which have reactive sites so that they are heat reactive with typical crosslinking agents used in the present invention. Such reactive sites include one or more of carboxyl groups, alcoholic hydroxyl groups and/or amine groups and the like. Phenolic alcoholic groups may be used in partial or total replacement of the alcoholic function in the polymer preparation. For food coatings water-based epoxy, water-based acrylic, high solids oleoresins, polyester, epoxy and vinyl are quite common. From an ecological and cost standpoint water-based acrylics and water-based epoxies are recommended. Hybrid systems such as epoxy-acrylics and epoxy-phenolics and various mixtures are most preferred for internal can coatings when formulated as dispersions, emulsions and latices.

One advantage of the instant process is that it eliminates multi-step, cleaning, rinsing and pretreatment steps which not only are time consuming but more importantly are quite expensive. In preparing the aluminum substrate for electrocoating, the substrate is usually rinsed with warm water to remove lubricants, cleaned with an acid cleaner and rinsed just with tap water, next with deionized water. Often an acid wash (Ridoline 24, Amchem Corp.) and water rinse is sufficient for the application of high adhesion coatings.

The invention is further illustrated by the following best mode examples but these examples should not be construed as limiting the invention. All parts shown are parts by weights and temperatures are given in degree Fahrenheit unless otherwise indicated.

EXAMPLE 1

A standard epoxy-acrylic electrocoating paint (28% solids) was formulated to contain 54 percent epoxy resin, 24 percent acrylic, 8 percent phenolic and 14 percent melamine crosslinking agent (Cymel 303, trademark of American Cyanamid). This composition was used as a base to evaluate various adhesion promoter candidates in the following formulation:

|  | Parts | | |
| --- | --- | --- | --- |
|  | A | B | C |
| epoxy acrylic resin | 400 | 400 | 400 |
| calcium dodedecyl benzene sulfonate | — | 0.6 | — |
| calcium citrate | — | — | 0.12 |
| deionized water | 1,129 | 1,129 | 1,129 |
| dimethylethanolamine | 6 | 6 | 6 |

Adhesion tests (experiments) were conducted using 5"×4" panels of aluminum alloy no. 5042 (Alcoa) having a thickness of 0.0009 inches. Drawn aluminum is given an aqueous acid wash with Ridoline 24 (Amchem Corporation), then rinsed well with water before electrocoating. For deposition of the organic coating the panels were immersed in an electrocoating bath containing the epoxy-acrylic paint at 8% solids and electrocoated at 100 V. for a period of ½-1 second. The panels were immediately removed from the bath, rinsed with deionized water and oven cured by heating at 4 or 8 minutes at various temperatures such as 380° F., 400° F., 420° F. The coated panels were then subjected to a sterilization treatment in water at 250° F. for 90 minutes. Each panel was evaluated by visual observation and by the cross-hatch adhesion test. The results for the A, B, C compositions are shown in Table 1 where coated untreated aluminum panels are compared with control aluminum panels which were pretreated before application of the organic coating. Referring to Table I it is seen that severe adhesion loss occurs only in the formulations where untreated aluminum is electrocoated with a paint composition containing no calcium adhesion promoter. No adhesion loss is observed when the system contains either calcium citrate (c) or calcium dodecylbenzene sulfonate (B) as the adhesion promoter.

TABLE I

| | | CURE CONDITIONS | | | | | |
|---|---|---|---|---|---|---|---|
| | | 400° F./8 min. | | 400° F./4 min. | | 420° F./8 min. | |
| Test No. | Pretreatment | Blush*** | Adhesion** | Blush*** | Adhesion** | Blush | Adhesion |
| Control A | Treated Aluminum | — | 0 | — | — | 0 | 0 |
| Control B | Treated Aluminum | 0-1 | 5 | 0-1 | 8 | 0 | 0 |
| Control C | Treated Aluminum | 0-1 | 0 | 0-1 | 0 | 0 | 0 |
| A | Untreated | 1-2 | 5-6* | 2-3 | 10* | 0 | 0 |
| B | Untreated | 1-2 | 0 | 2-3 | 0 | 0 | 0 |
| C | Untreated | 2 | 0 | 3 | 0 | 0 | 0 |

*adhesion failure only on inside of can
**10 = 100% adhesion loss; 0 = no loss of adhesion
***blush rating: 0-10; 0 = no blush; 10 = totally opaque white

EXAMPLES 2

The procedure of Example 1 was repeated using untreated aluminum panels which had been electrocoated with an epoxy-acrylic paint formulation containing 0.12 parts calcium citrate and these were compared with panels electrocoated with the same formulation but containing no calcium adhesion promoter. As shown in Table II, evaluations were conducted under sterilization conditions (250° F./90 minutes) using tap water, corn and stewed tomatoes.

From Table II it is seen that addition of calcium citrate to the epoxy-acrylic paint protects untreated aluminum. When calcium citrate was added at 0.12 parts per 400 parts epoxy-acrylic paint concentrate there were no adhesion loss under sterilization conditions (250° F./90 minutes) using either tap water, corn or stewed tomatoes. In contrast when the coating contained no calcium protectant, loss of adhesion was noted in the tests using tap water; severe losses were noted with stewed tomatoes. However, when corn was used, adhesion loss was not observed.

TABLE II

| | | | CURE CONDITIONS | | | | | | | | |
|---|---|---|---|---|---|---|---|---|---|---|---|
| | Test | Adhesion | 380° F./8 min. | | 400° F./4 min. | | 400° F./8 min. | | 400° F./10 min. | | 420°F./6 min. |
| Test No. | Solution | Promoter | Blush | Adhesion** | Blush | Adhesion | Blush | Adhesion | Blush | Adhesion | Blush | Adhesion |
| 1 | Tap Water | Ca Citrate | 8 | 0 | 9-10 | 0 | 7 | 0 | 6 | 0 | 2 | 0 |
| Control | Tap Water | None | 6 | 0-4 | 6 | 0-5 | 2 | 0-3 | 0-1 | 0 | 0 | 0 |
| 2 | Corn | Ca Citrate | 4-5 | 0 | 5-6 | 0 | 4 | 0 | — | — | 0 | 0 |
| Control | Corn | None | 2 | | 1 | 0 | 0 | 0 | — | — | 0 | 0 |
| 3 | Tomatoes | Ca Citrate | 6 | 0 | 6 | 0 | 3 | 0 | — | — | 0 | 0 |
| Control | Tomatoes | None | 4 | 0-8 | 3 | 10 | 2 | 0-5 | — | — | 0 | 0 |

**Total Adhesion Loss = 10; No Adhesion Loss = 0

EXAMPLE 3

Gallon size samples of electrocoat paint were prepared using an epoxy-acrylic paint described in Example 1 having the following properties: NV=29.8%; Acid #74.3; MEQ—87.9%; % neutralization 66:

| | A | B | C* |
|---|---|---|---|
| epoxy-acrylic paint base | 350 | 350 | 350 |
| Cymel 303 | 18 | 18 | 20 |
| cyclohexanol | 37 | 37 | 37 |
| epoxy phosphate promoter | — | — | 41 |
| deionized water | 1,162 | 1,162 | 1,288 |
| dimethylethanol amine | 4 | 4 | 4 |
| calcium citrate | — | 0.12 | — |

The above coatings were electrodeposited on untreated aluminum panels and subjected to various bake temperatures for a 4-minute duration. Sterilization tests were conducted at 250° F. for 90 minutes using tap water, tomatoes, dog food and corn. Table III shows the calcium citrate was effective in promoting adhesion of the epoxy-acrylic coating to untreated aluminum and these coatings remained effective in the sterilization processing of tomatoes and dog food. The calcium promoter was at least equivalent to that of a commercial epoxyphosphate promoter.

TABLE III

| Comparison of Calcium Citrate Additive With Epoxyphosphate Additive in Adhesion Promoters | | | | | | | | |
|---|---|---|---|---|---|---|---|---|
| | | | Bake Temperature (4 Minutes) | | | | | |
| | | | 380° F. | | 400° F. | | 420° F. | |
| Test No. | Test Solution | Adhesion Promoter | Blush | Adhesion | Blush | Adhesion | Blush | Adhesion |
| 3A | Water | None | 0-1 | 0 | 0 | 0 | 0 | 0 |
| 3B | Water | Epoxyphosphate | 0-1 | 0 | 0 | 0 | 0 | 0 |

TABLE III-continued

Comparison of Calcium Citrate Additive With Epoxyphosphate Additive in Adhesion Promoters

| | | | Bake Temperature (4 Minutes) | | | | | |
|---|---|---|---|---|---|---|---|---|
| | | | 380° F. | | 400° F. | | 420° F. | |
| Test No. | Test Solution | Adhesion Promoter | Blush | Adhesion | Blush | Adhesion | Blush | Adhesion |
| 3C | Water | Calcium Citrate | 0-1 | 0 | 0 | 0 | 0 | 0 |
| 3A | Tomatoes | None | 0-1 | 10 | 0-1 | 10 | 0 | 0 |
| 3B | Tomatoes | Epoxyphosphate | 0-1 | 0 | 0 | 0 | 0 | 0 |
| 3C | Tomatoes | Calcium Citrate | 0-1 | 0 | 0 | 0 | 0 | 0 |
| 3A | Dog Food | None | 0 | 0-2 | 0 | 0 | 0 | 0 |
| 3B | Dog Food | Epoxyphosphate | 0 | 0 | 0 | 0 | 0 | 0 |
| 3C | Dog Food | Calcium Citrate | 0 | 0 | 0 | 0 | 0 | 0 |

EXAMPLE 4

In an experiment comparing calcium citrate with calcium hydrogen phosphate as adhesion promoters the following compositions were electrocoated on untreated aluminum and evaluated for adhesion loss after processing in tomatoes (250° F. for 90 minutes).

| | A | B | C |
|---|---|---|---|
| epoxy-acrylic paint | 350 | 350 | 350 |
| Cymel 303 | 18 | 18 | 18 |
| cyclohexanol | 37 | 37 | 37 |
| deionized water | 1,080 | 1,080 | 1,080 |
| diethanolamine | 1.3 | 1.3 | 1.3 |
| calcium citrate | 0.12 | — | — |
| calcium hydrogen phosphate | — | 0.12 | — |
| calcium phosphate (anhydrous) | 0 | — | 0.12 |

The calcium citrate protected coating gave no adhesion loss when the coating was cured for 6 minutes at temperatures of 380° F., 400° F. or 420° F. In contrast the coatings with calcium hydrogen phosphate showed complete adhesion loss when cured 6 minues at 380° F. or 400° F. and severe loss (rating 5) when cured for 6 minutes at 420° F. It appears the calcium hydrogen phosphate is actually detrimental to adhesion.

A similar experiment using 0.12 parts anhydrous calcium phosphate gave total adhesion loss when the panels were processed in tomatoes.

In a similar experiment using 0.12 parts calcium acetate added as a powder, considerable kick out of solution was noted and film weights of only 2.44 mg/in$^2$ were obtained. In the tomato pack test only slight improvement of adhesion was noted in contrast with no adhesion loss with the calcium citrate additive.

EXAMPLES 5-11

A master batch of epoxy-acrylic-phenolic resin was prepared with Epon 1004 Epoxy resin having a molecular weight of approximately 1,900 as opposed to Epon 1007 Epoxy (mol. wt. about 3,600) used in the foregoing examples. Panels coated with this composition was quite susceptible to adhesion failure when processed in stewed tomatoes for 90 minutes at 250° F. The resin, as an emulsion (31.5% solids), contained 64 percent Epoxy 1004, 27 percent acrylic, 9 percent phenolic and exhibited as acid number of #69. The master batch, having 8 percent solids, was formulated as follows:

| Epoxy/Acrylic/Phenolic Emulsion | 2,500 |
|---|---|
| Cymel 303 | 142 |
| Cyclohexanol | 142 |
| Dimethylethanolamine | 23.5 |
| DI H$_2$O | 8,966 |

Various acidic salts were evaluated as adhesion promoters for the master batch electrocoating batch, usually as a 20 percent solution of the salt in water. The various formulations designated as Examples 5 through 11 are shown in Table IV. Each bath was electrocoated on cleaned, untreated aluminum to give about 5 mg/in$^2$ coating when applied at 100 volts for 1.5 seconds. Panels were baked for 4 minutes at temperatures of 380° F., 400° F. and 420° F. (Peak Metal Temperature) and then processed in stewed tomatoes for 90 minutes at 250° F. The adhesion results using the adhesion promoters are compared in Table V with the master batch using no adhesion promoter. Each test panel was rated on a scale of 0–10; a zero (0) rating indicates no adhesion loss wherein a 10 rating indicates 100 percent adhesion loss or failure. From Table V it is seen that sodium malate, magnesium citrate and sodium citrate provide no adhesion loss when the coated panels are baked at 380° F., 400° F. or 420° F. prior to processing stewed tomatoes for 90 minutes at 250° F.

TABLE IV

Evaluation of Various Organic Acid Salts in Master Batch

| Components | Ingredients (Parts by Weight) | | | | | | |
|---|---|---|---|---|---|---|---|
| (Example No.) | 5 | 6 | 7 | 8 | 9 | 10 | 11 |
| Master Batch (Control) | 1,200 | 1,200 | 1,200 | 1,200 | 1,200 | 1,200 | 1,200 |
| Sodium Malate* | 0.75 | — | — | — | — | — | — |
| Sodium Lactate* | — | 0.75 | — | — | — | — | — |
| Sodium Salicylate** | — | — | 0.75 | — | — | — | — |
| Calcium Dodecyl* benzene sulfonate | — | — | — | 0.75 | — | — | — |
| Magnesium Citrate*** | — | — | — | — | 0.14 | — | — |
| Sodium Citrate* | — | — | — | — | — | 0.75 | — |
| Sodium Benzoate* | — | — | — | — | — | — | 0.75 |

*As 20 Percent Solution in Water
**20 Percent in Isopropanol: Water (75:25)
***100 Percent Solids

TABLE V

Comparison of Various Adhesion Promoters
(Processed in Tomatoes 90 Minutes at 250° F.)
Cure Conditions (Peak Metal Temperature)

| Example No. | 380° F./4 Min. | 400° F./4 Min. | 420° F./4 Min. |
|---|---|---|---|
| Control** | 9-10 | 9-10 | 9-10 |
| 5 | 0 | 0 | 0 |
| 6 | 8-9 | 4-5 | 0-1 |
| 7 | 5-7 | 7-8 | 2-3 |
| 8 | 9-10 | 5-7 | 8-9 |
| 9 | 0 | 0 | 0 |
| 10 | 0 | 0 | 0 |
| 11 | 9-10 | 9-10 | 9-10 |

*0 = No Adhesion Loss 10 = 100% Adhesion Loss
**Master Batch with no Adhesion Promoter Additive

What is claimed is:

1. A method for improving the adhesion of water-base paints to an untreated aluminum substrate which comprises
(a) cleansing the untreated aluminum surface with an aqueous acid wash and water washing said cleaned surface
(b) subjecting the untreated cleaned aluminum to an electrocoating paint composition comprising an epoxy-acrylate resin, a crosslinking agent and about 0.01 to about 2.0 parts, basis total resin, of an adhesion promoter wherein said promoter is an alkaline earth metal salt of citric acid and the metal is selected from the group consisting of calcium, magnesium and zinc
(c) electrodepositing said composition to deposit a film coating on said substrate
(d) curing the deposited film.

2. The method of claim 1 wherein said adhesion promoter is calcium citrate present in an amount of from 0.03 to 0.30 parts perhundred parts of resin.

3. The method of claim 1 wherein said adhesion promoter is magnesium citrate.

4. A method for coating an untreated aluminum substrate which can be formed into a can with a sanitary coating sufficient for the containment of acidic foods and which will withstand sterilization processing which comprises electrocoating a cleansed but untreated aluminum substrate with a paint composition comprising an epoxy-acrylate resin, a crosslinking agent and about 0.01 to about 2.0 parts, basis total resin, of an adhesion promoter selected from the group consisting of calcium and magnesium salts of citric acid.

5. A method for coating an untreated aluminum substrate for fabrication into cans having a sanitary coating sufficient for the containment of acidic foods and which will withstand sterilization processing which comprises electrocoating a cleansed but untreated aluminum substrate with a paint composition comprising an epoxy-acrylate resin, a crosslinking agent and about 0.01 to about 2.0 parts, basis total resin, of an adhesion promoter selected from the group consisting of calcium and magnesium salts of dodecylbenzene sulfonic acid.

6. The method of claim 5 wherein the said adhesion promoter is calcium dodecylbenzene sulfonate.

* * * * *

UNITED STATES PATENT AND TRADEMARK OFFICE
CERTIFICATE OF CORRECTION

PATENT NO. : 4,576,695
DATED : Mar. 18, 1986
INVENTOR(S) : Phillip M. Owens

It is certified that error appears in the above-identified patent and that said Letters Patent are hereby corrected as shown below:

First page, Appl. No., "554,692" should read --554,691--.

Claim 1.(b), lines 12 and 13: Delete "and the metal is". (Column 11).

Signed and Sealed this

Seventh Day of October, 1986

[SEAL]

Attest:

DONALD J. QUIGG

*Attesting Officer*  *Commissioner of Patents and Trademarks*